United States Patent [19]

Erlenmaier et al.

[11] Patent Number: 4,950,861
[45] Date of Patent: Aug. 21, 1990

[54] COMBINATION PUNCH PRESS AND LASER CUTTING MACHINE WITH MOVABLE SLAG AND FUME COLLECTOR

[75] Inventors: Werner Erlenmaier, Gerlingen; Reiner Koch, Leonberg-Hoefingen, both of Fed. Rep. of Germany

[73] Assignee: Trumpf GmbH & Co., Ditzingen, Fed. Rep. of Germany

[21] Appl. No.: 405,464

[22] Filed: Sep. 11, 1989

[51] Int. Cl.⁵ .............................................. B23K 26/00
[52] U.S. Cl. .......................... 219/121.67; 219/121.82; 219/121.84
[58] Field of Search ...................... 219/121.67, 121.72, 219/121.7, 121.71, 121.84, 121.6, 121.85, 121.82

[56] References Cited

U.S. PATENT DOCUMENTS 4,409,463 10/1983 Duruz et al. ................... 219/121.67
4,434,349 2/1984 Tsutsumi ........................ 219/121.67
4,698,480 10/1987 Klingel ........................ 219/121.84 X Primary Examiner—C. L. Albritton

[57] ABSTRACT

A combination punch press and laser cutting machine has a frame with a ram in its head mounted for reciprocation along a vertical axis, and a die support member in the base below the ram. The support member has a vertical passage therethrough and a horizontal passage extending thereinto. A frame and slag collection member is supported for movement from a position outwardly of the support member passage to a position inwardly thereof wherein it blocks the vertical passage. The collection member has a coolant distribution system for cooling it and flowing coolant over the surface of a slag collecting cavity therein, a waste removal conduit, and a fume removal conduit, all of which are operational during laser cutting action.

22 Claims, 9 Drawing Sheets

COMBINATION PUNCH PRESS AND LASER CUTTING MACHINE WITH MOVABLE SLAG AND FUME COLLECTOR

BACKGROUND OF THE INVENTION

The present invention relates to combination punch press and laser cutting machines and more particularly to an improved collector assembly in the base of the punch press to collect the fume and slag from the laser cutting operation.

Combination punch press and thermal cutting machines have enjoyed substantial acceptance in providing a high degree of versatility in sheet metal processing since the user may readily punch or nibble small holes and thermally cut larger ones on the container of the finished workpiece. Although plasma cutting had been favored for cost and speed considerations, particularly in some industrial environments, development of relatively low cost high powered lasers has led to wider usage of laser cutting. Clark et al U. S. Pat. No. Re. 31,042 discloses that it is necessary to space the laser beam generator from the punch press machine in order to isolate it from the punch press vibrations, and also to provide a second work station for the laser cutting operation which is offset from the punching station. Klingel U S. Pat. No. 4,698,480 discloses the advantages to, and an apparatus for, placing the laser beam cutting head at the punching station so that there is a simple work station about which the workpiece is moved. Recently, Amada German Offenlegungsschrift No. DE 3814630 Al has proposed mounting the laser beam generator on an extension of the base of the punch press machine frame and transporting the laser beam over the head of the frame and then downwardly to the cutting head at a work station offset from the punching station.

As is also well known, the laser beam produces a considerable amount of heat during the cutting operation, and generates slag from the molten metal as it cuts therethrough. It is customary to provide in the machine base, a collector which will capture the slag, provide cooling in the area underneath the cutting action, and also provide means for collecting the fume which is generated.

Heretofore, it has been customary to provide a relatively large, cooled collector unit in the machine base at a location spaced from the punching operation in order to effectively accomplish cooling, fume withdrawal and slag removal. However, the aforementioned Klingel Patent has disclosed the desirability of moving a fume and slag collector could be moved into the die position in the base to accomplish this result, and for effecting that movement from a position in the tool storage device normally associated therewith. Generally, however, the amount of slag, fume removal and cooling action required for a high power laser, dictate a fairly large collector component in the base which cannot normally be carried in the tool changer apparatus.

It is an object of the present invention to provide a novel combination punch press and laser cutting machine in which there is provided in the base a novel collector assembly for fume and slag collection and for cooling.

It is also an object of the invention to provide such a novel collector assembly in which the collector may be moved from an operative position in the die support member to an inoperative position spaced therefrom.

Another object is to provide such a machine in which the collector may be moved automatically without interfering with the tool changing operation.

Still another object is to provide such a machine in which various operations are performed rapidly and accurately under computer control.

SUMMARY OF THE INVENTION

It has now been found that the foregoing and related objects maY be readily attained in a combination punch press and laser cutting machine which utilizes a frame having a base and a head extending in spaced relationship thereover, and a ram assembly in the head having a ram vertically reciprocatable therein relative to the base. The axis of reciprocation of the ram defines a work station, and a die support member is provided in the base at the work station. This die support member has a first passage extending vertically therethrough and a second passage extending horizontally thereinto intermediate the height of a vertical face thereof.

A horizontally disposed fume and slag collection member has a portion cooperatively dimensioned and configured to move horizontally inwardly of the horizontal second passage in the die support member and in which position it substantially blocks the vertical first passage. The portion of the collection member disposed in the vertical passage has an upwardly opening cavity therein, and the collection member has coolant conduit means therein extending from an inlet to a distributor to distribute coolant about the cavity. It also has waste collecting conduit means extending from the base of the cavity to an outlet, and fume collecting conduit means for collecting fume from the upper part of the cavity and extending to an outlet. Mounting means mounts the collection member in the base of the machine frame for horizontal movement between an operative position extending across the vertical first passage in the die support member and an inoperative position disposed outwardly from the die support member, and there is provided drive means for moving the collection member between the operative and inoperative positions.

In the preferred embodiment, the mounting means includes at least one horizontally disposed support along which the collection member is reciprocatable between the two positions, and the horizontally disposed support desirably comprises a pair of rods with the support member having slide elements thereon slidable along the rods.

Desirably, the collection member has a lower section providing the cavity and a portion of the waste collecting conduit means, and an upper section providing at least a portion of the fume collecting conduit means. The lower section also provides a portion of the coolant conduit means, which includes a passage extending below the cavity toward the inner end of the portion and an upwardly extending portion adjacent the inner end to cause coolant to flow over the base surface of the member providing the upwardly opening cavity and then toward the waste collecting conduit means.

Preferably, the upper surface of the die support member is configured to seat a die member, and there is punch mounting means on the ram. Tool carrier means carries a multiplicity of punches for mounting in the punch mounting means, and cooperating die members for mounting on the upper surface of the die support member. Tool changer means moves the punches and die members between the tool carrier means and the punch mounting means and die support member. The tool changer means and tool storage means are disposed at one radial position about the axis of reciprocation of the ram, and the horizontal passage and the collection member are disposed at a second position radially displaced therefrom. Desirably, the radial displacement is approximately 180°.

Conveniently, the die support member is of generally rectangular cross section and the horizontal second passage is of generally rectangular cross section with the wall of the support member providing horizontally extending shoulders about the passage to seat the collection member in the operative position. The die support member has its upper surface configured to provide a seating surface for a die member, and the die member has a support element cooperatively configured and dimensioned to seat on the seating surface and a die seated in an aperture in the support element.

Desirably, the drive means is controlled by a computer control as is the tool changer means. Included are means for supplying coolant to the coolant conduit means, fume withdrawal means for drawing fume from the fume collecting conduit means, and discharge means for transporting waste from the collection member to the exterior of the machine, all of which are controlled by a computer control.

DETAILED DESCRIPTION OF PREFERRED EMBODIMENT OF THE INVENTION

Figure 1:
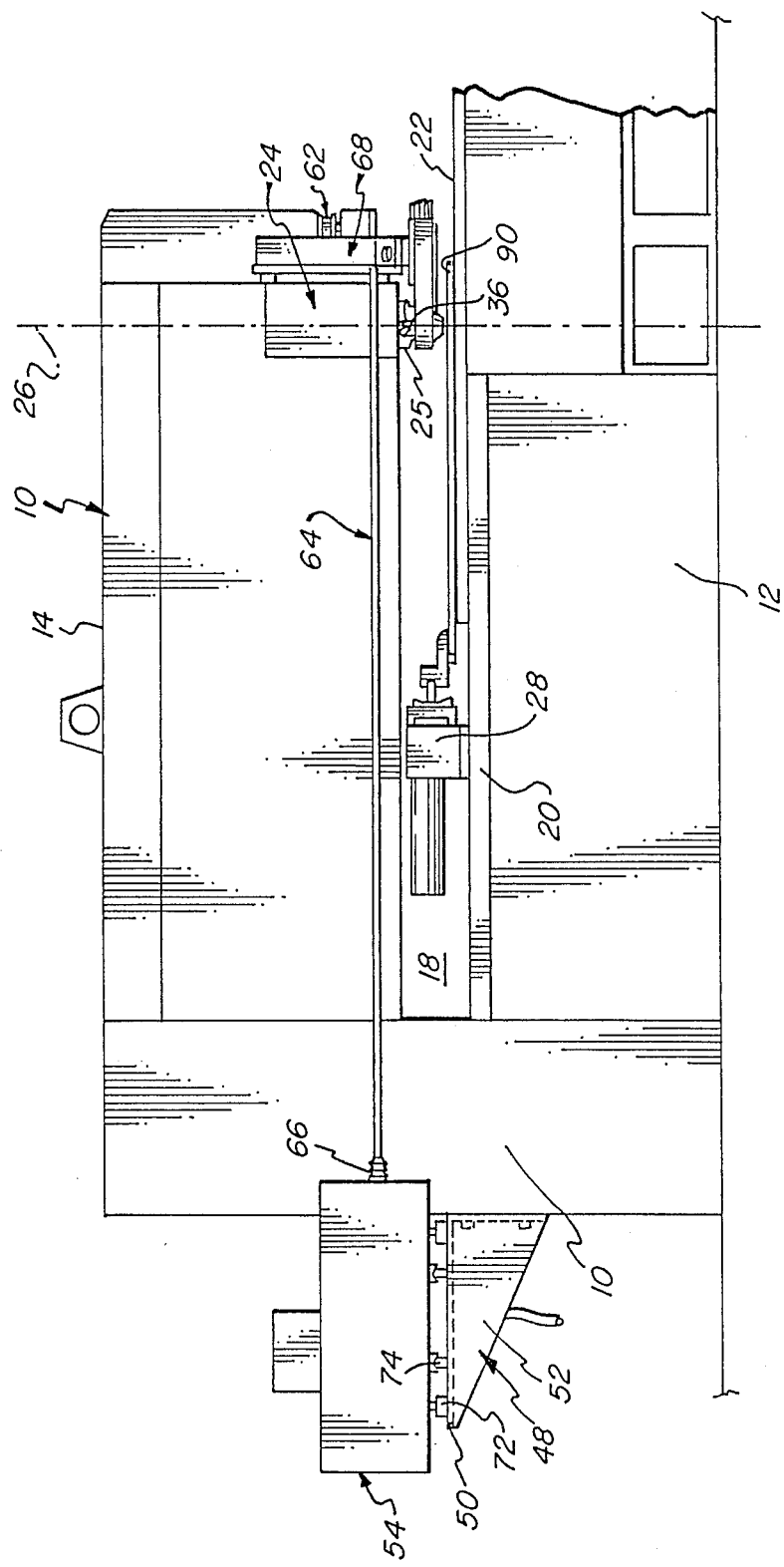
FIG. 1 is a fragmentary side elevational view of a combination punch press and laser cutting machine embodying the present invention, showing the laser cutting head in operational position.
Figure 2:
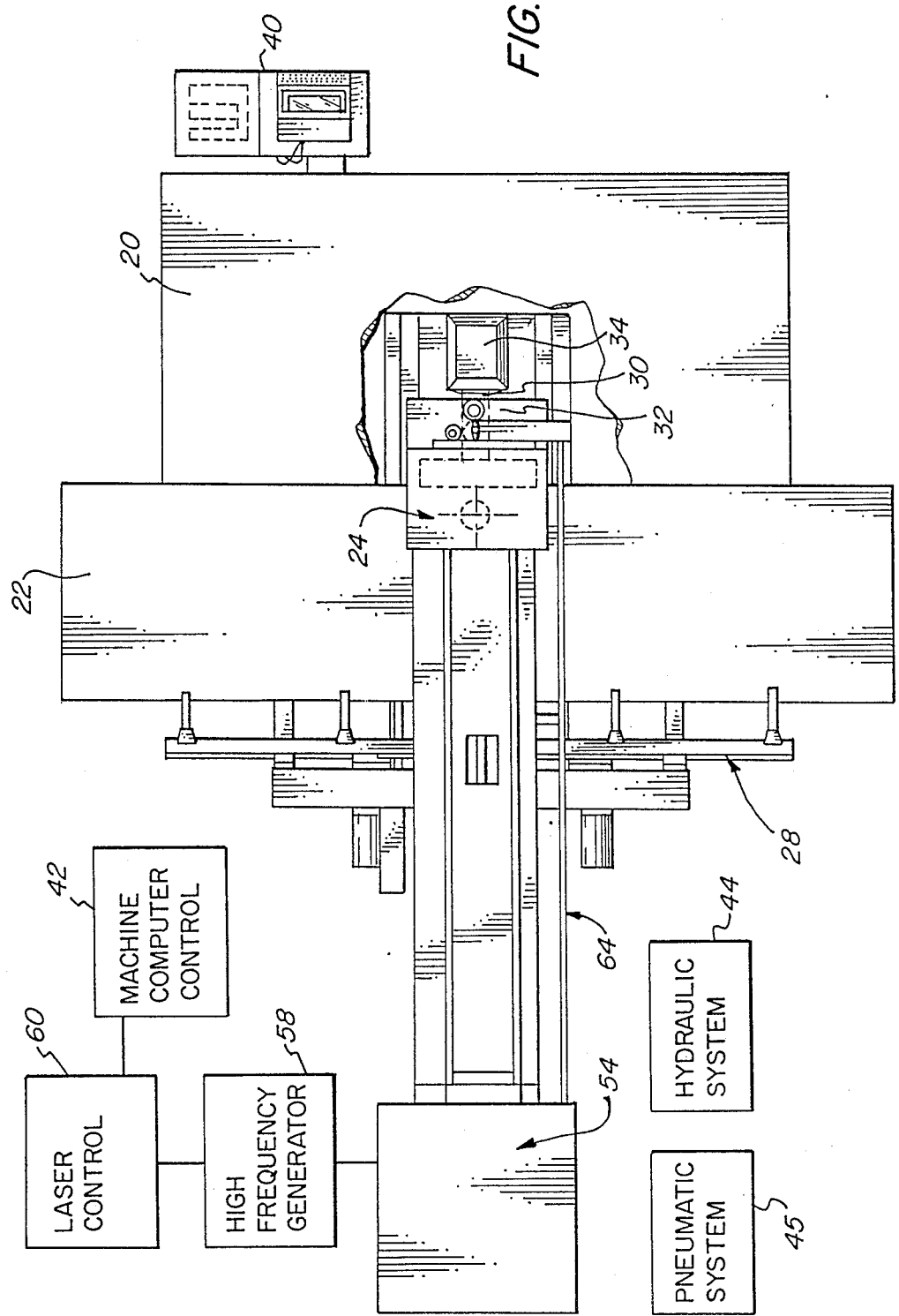
FIG. 2 is a top plan view thereof with a portion of the worktable broken away and additionally showing additional elements of the installation.

Turning first to FIGS. 1 and 2, therein illustrated is a combination punch press and laser cutting machine embodying the present invention. The machine has a rigid frame generally designated by the numeral 10 which is of generally C-shaped configuration with an elongated base 12, an elongated head 14 extending thereover in vertically spaced relationship, and a spacing web or neck 16 extending therebetween at the rearward end thereof. The web 16 defines the height of the throat 18 or spacing between the head 14 and base 12, and it also limits rearward movement of the workpiece and support and guidance systems for the workpiece (i.e., the length of the throat).

Carried on the base 12 is a worktable 20 which supports the workpiece 22, and a ram assembly generally designated by the numeral 24 is disposed at the forward end of the head 14. The axis of reciprocation is of the ram 25 is designated by the dotted line 26 and it defines the work station for the machine. The workpiece clamping and guidance system 28 is supported on the base 12 and moves the workpiece 22 about the worktable 20.

Also mounted in the base 12 is a tool storage and changer system generally designated by the numeral 30 and of the type illustrated in Klingel U.S. Pat. No. 4,719,691. It has a circular storage member 32 rotatable about a horizontal axis, and it seats a number of punch and die sets (not shown) in recesses about its circumferences. It is movable rearwardly by the drive unit 34 to seat, or to engage and remove, punches and dies, in the tool mounting portion 32 at the base of the ram assembly 24 and support block 102 (seen in FIG. 6 et seq.) in the base 12.

Also seen in FIG. 2 is a control console 40 for the computer control unit 42 and a hydraulic unit 44 which provides hydraulic fluid under pressure to reciprocate the ram 25, and to effect operation of various other elements under the control of the control unit 42.

As seen in FIG. 1, the frame 10 has a platform assembly generally designated by the numeral 48 which extends rearwardly thereof at its web portion 16. The platform assembly 48 includes a horizontal member 50 and struts or braces 52 which are disposed therebelow and extend to the web portion 16 and base 12. Seated on the horizontal member 50 is a laser beam generator generally designated by the numeral 54 and having a exit aperture 56 disposed to one side of the frame 10. The power to ionize a lasing gas in the generator 54 is provided by the high frequency generator 58, and the control unit therefor is designated by the numeral 60 and is also coupled to the computer control unit 42 and the console 40.

Mounted on the forward end of the head 14 of the frame 10 is a laser cutting head generally designated by the numeral 62. Extending from the exit aperture 56 of the laser generator 54 to the cutting head 62 is a beam transport assembly generally designated by the numeral 64 and including a flexible bellows portion 66 at its rearward end providing the terminal portion to the aperture 56. At its forward end is a beam redirecting system generally designated by the numeral 68 and operatively coupled to the cutting head 62.

Figure 3:
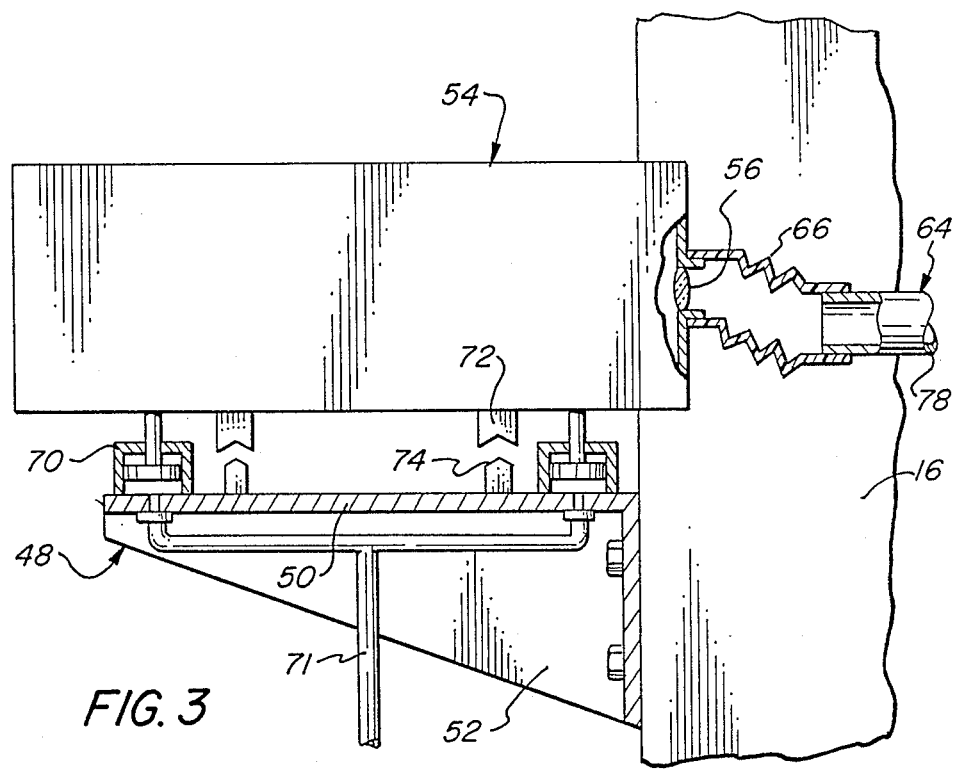
FIG. 3 is a fragmentary side elevational view of the rear end thereof drawn to an enlarged scale and with various elements in partial section.
Figure 4:
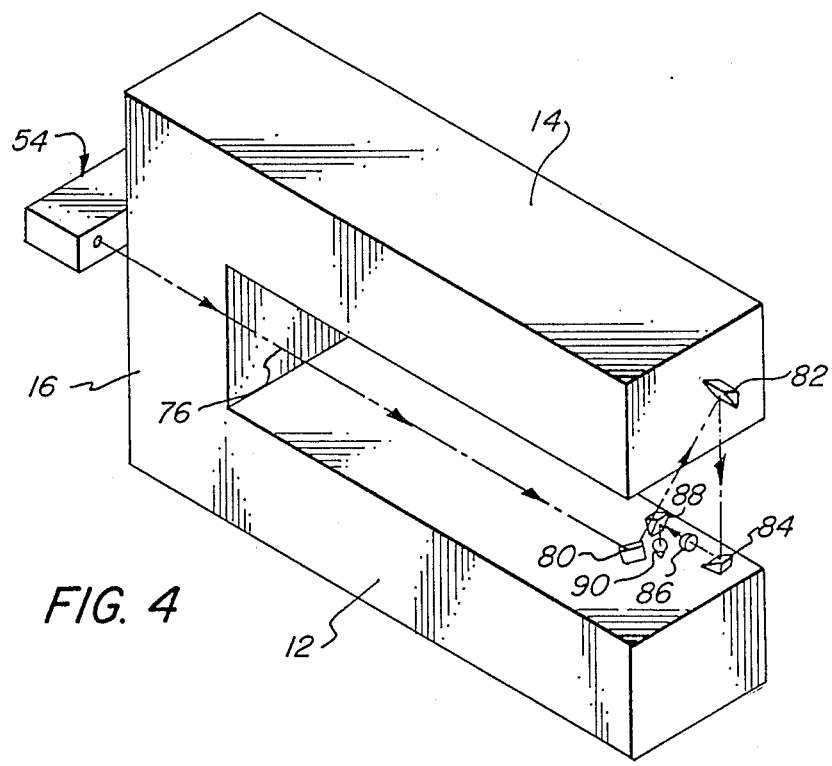
FIG. 4 is a schematic view showing the path of the laser beam from the laser beam generator to the nozzle of the cutting head.
Figure 5:
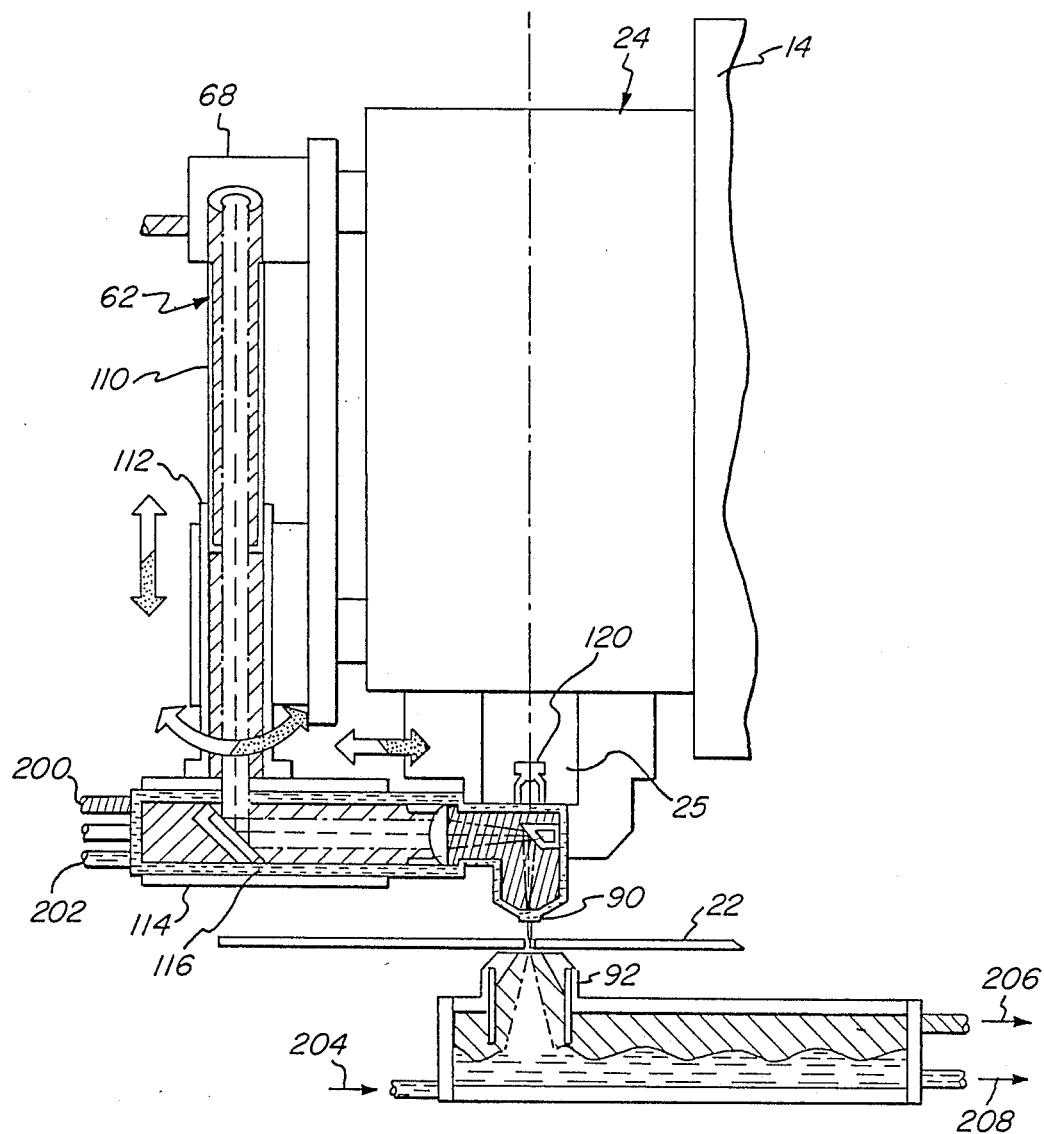
FIG. 5 is a semi-diagrammatic view of the laser cutting head and collector at their operative position and showing the laser beam cutting workpiece.

Turning now to FIG. 3, therein illustrated are vibration isolating members 70 supporting the laser beam generator 54 on the horizontal element 50 of the platform 48. In the punching mode, air is supplied through the conduit 71 to the cylinders of the members 70 to move the pistons upwardly, and the generator 54 is thus supported on a fluid medium which damps vibrations. Also shown are cooperating elements 72,74 on the base of the laser beam generator 54 and platform element 50 to precisely position the laser beam generator 54 in its lowered and operative position. Upon withdrawal of the fluid from the members 70, the generator 54 descends and is positioned by the elements 72,74. As seen in FIG. 4, the flexible portion 66 of the beam transport assembly 64 flexes to accommodate the vertical displacement of the laser beam generator 54.

As indicated in FIGS. 1–5, the laser beam 76 passes through the tube 78 of the beam transport assembly 64 to the front of the head 14 of the frame 10, and it is disposed to one side of the machine frame 10 and along its throat 18. At the forward end, it has a beam redirecting component 68 with an angularly disposed coated mirror 80 which redirects the beam at an angle of about 45° upwardly and inwardly to a mirror 82 which is located on the centerline of the head 14. This mirror 82 is angular disposed and redirects the beam at an angle of 45° downwardly to the mirror 84 in the cutting head 62. Spaced from the mirror 84 is a lens 86 which partially focuses the beam onto the surface of the mirror 88 which further focuses the beam and redirects it at an angle of 90° through the aperture in the nozzle 90 onto the workpiece 22.

Below the workpiece 22 in the base 12 is a diagrammatically illustrated slag and fume collector generally designated by the numeral 100 which has water flowing therein to cool it and carry slag away, and it is also connected a source of suction to draw away fumes generated by the thermal cutting process.

Figure 6:
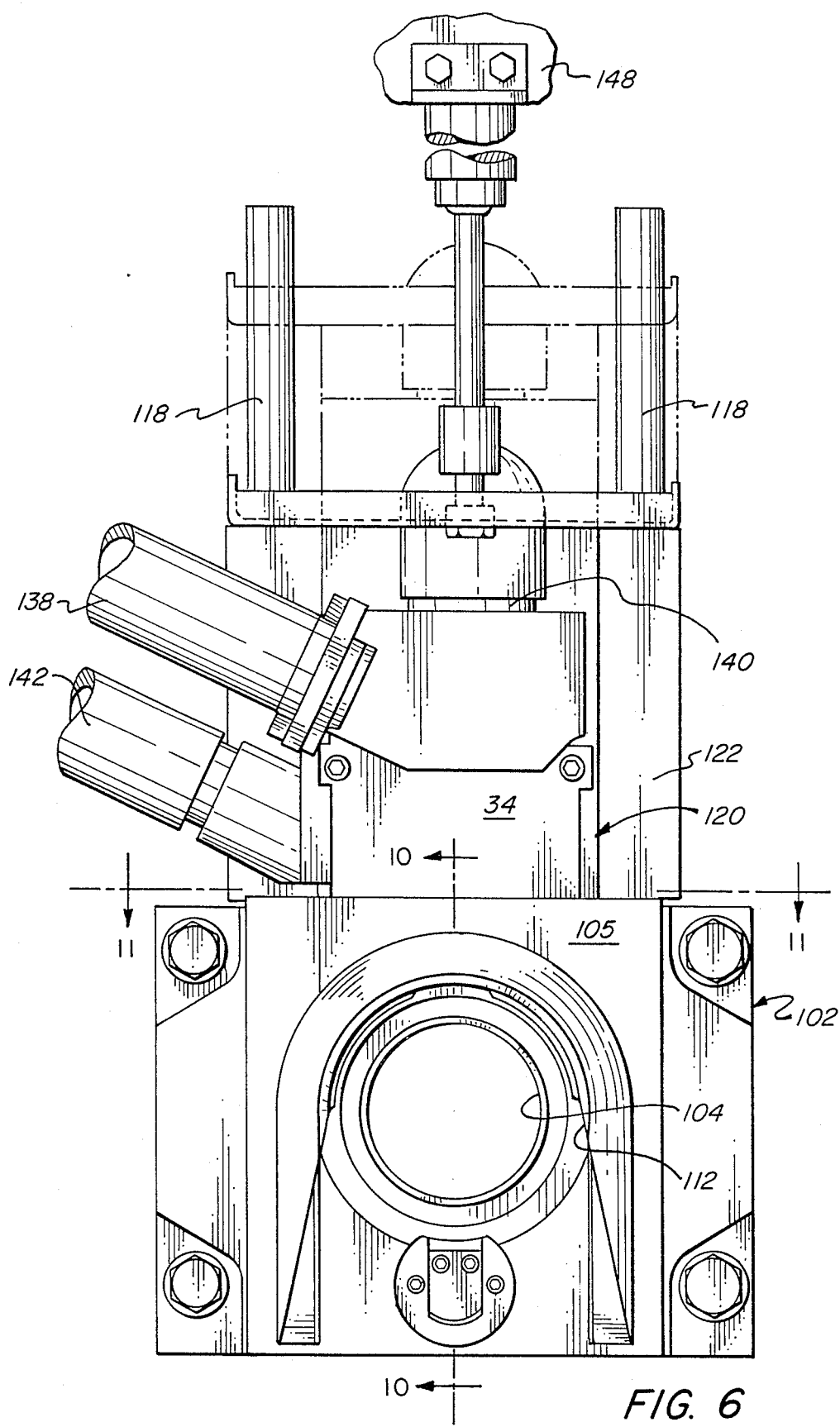
FIG. 6 is a plan view of the support block and collection member assembly of the present invention, with the collection member seated in the support block.
Figure 7:
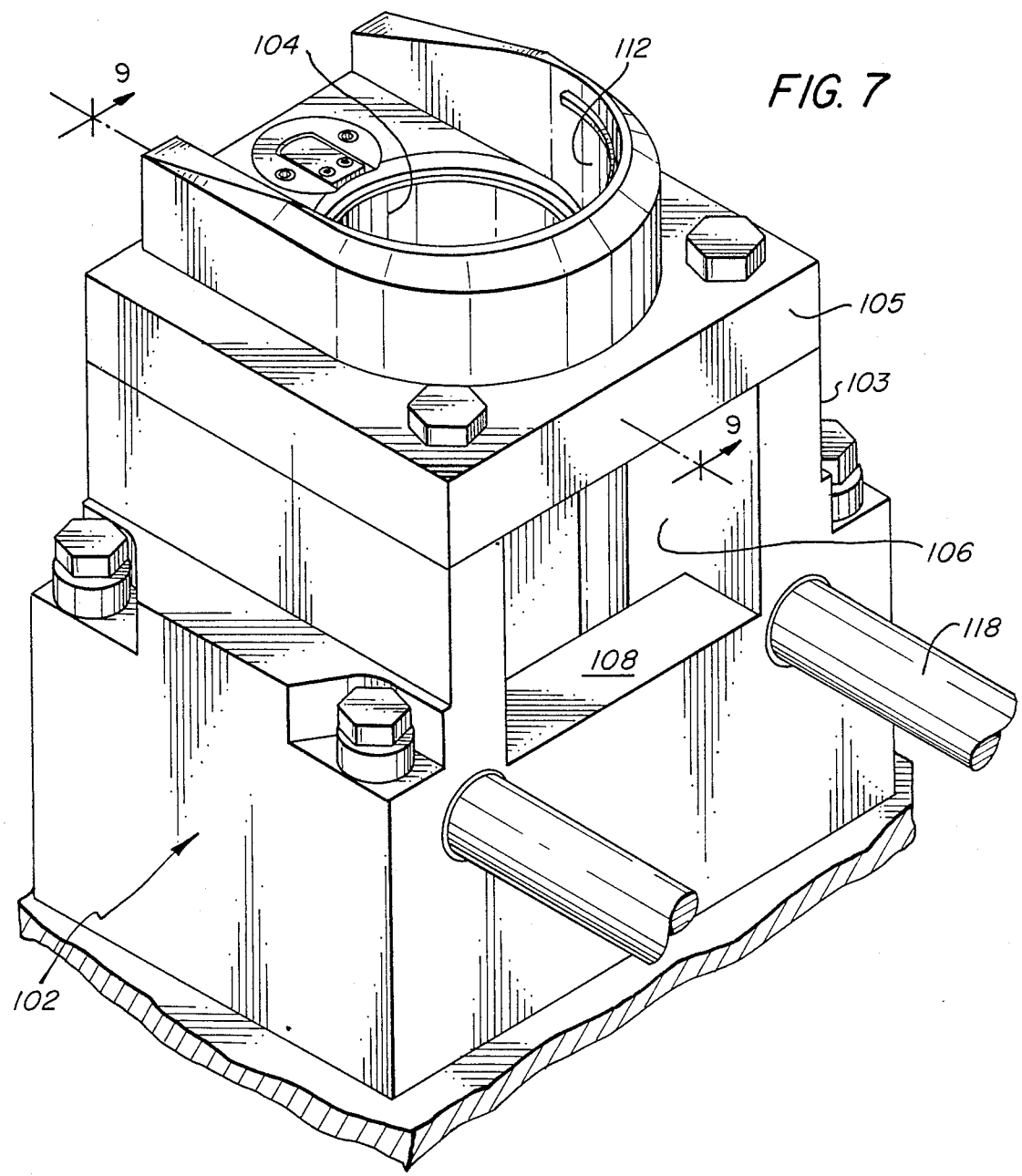
FIG. 7 is a perspective view of the support block with the rods for sliding support of the collection member fragmentarily illustrated and without a die and die carrier seated thereon.
Figure 8:
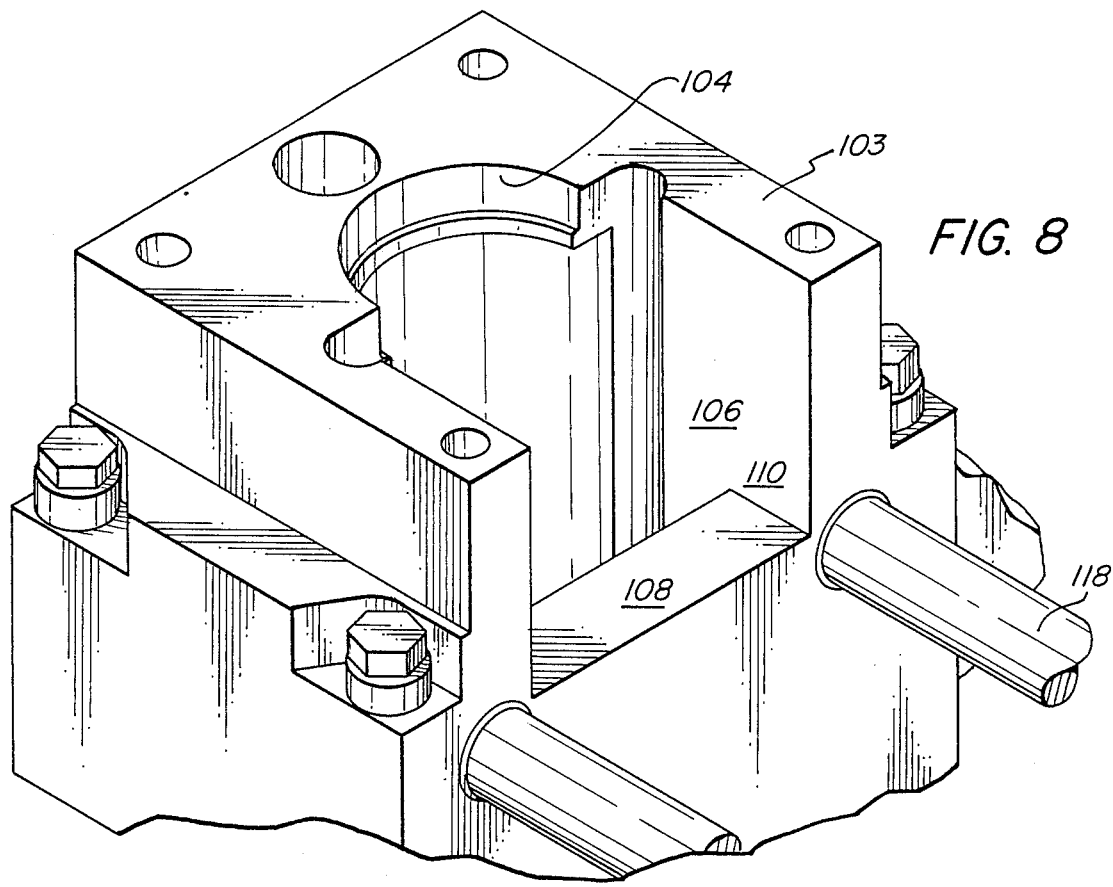
FIG. 8 is a perspective view of the lower member of the support without the collection member block.
Figure 9:
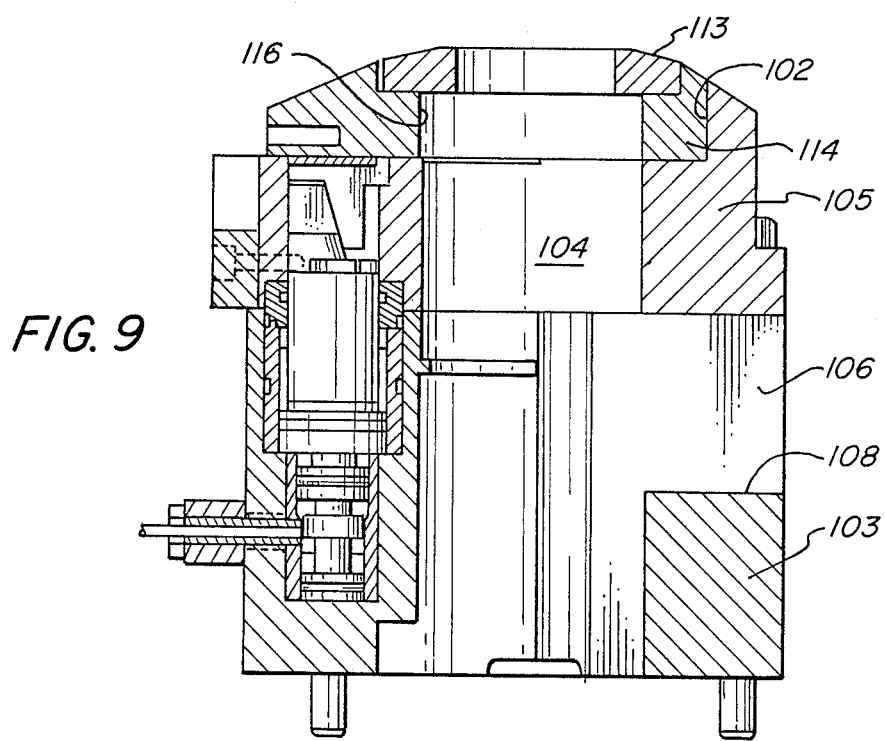
FIG. 9 is a sectional view along the line 9—9 of FIG. 7 showing a die support element and die seated on the support block.
Figure 10:
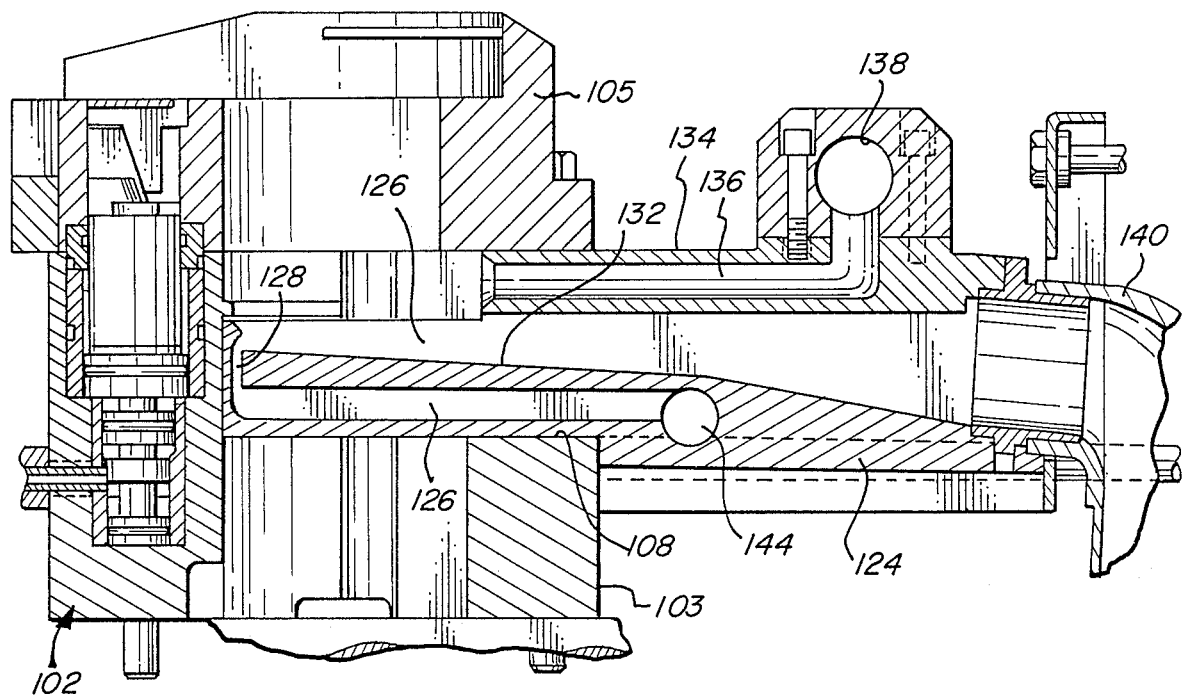
FIG. 10 is a fragmentary sectional view along the line 10—10 of FIG. 6 but with the top member removed.

In FIGS. 6 and 10, the novel collector assembly is illustrated in the operative position for laser cutting. The support block is generally designated by the numeral 102 and is of generally rectangular cross section. As best seen in FIGS. 7 and 9, it has a passage 104 extending vertically therethrough, and a rectangular passage 106 extending horizontally thereinto provided by the rectangular cutout which provides a horizontal shoulder 108 and vertical shoulders 110 in the face. The upper end of the passage 104 is of circular configuration with a shoulder 112 thereabout to seat the die support element 114. The circular aperture 116 in the support element in turn seats a die 117.

As seen in FIG. 7, the support block 102 is comprised of a base member 103 providing the horizontal passage 106 and a top member 105 which are bolted together.

Figure 11:
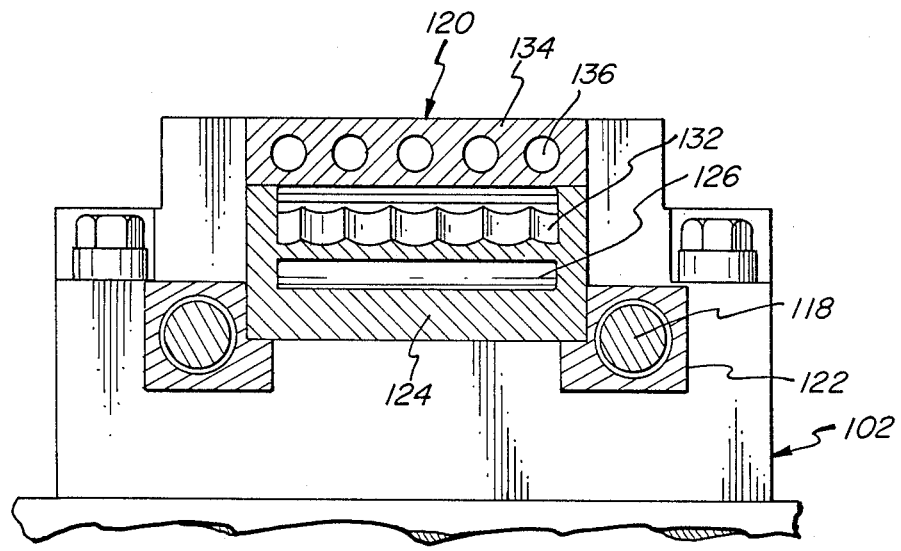
FIG. 11 is a sectional view along the line 11—11 of FIG. 6 but with the top member removed.
Figure 12:
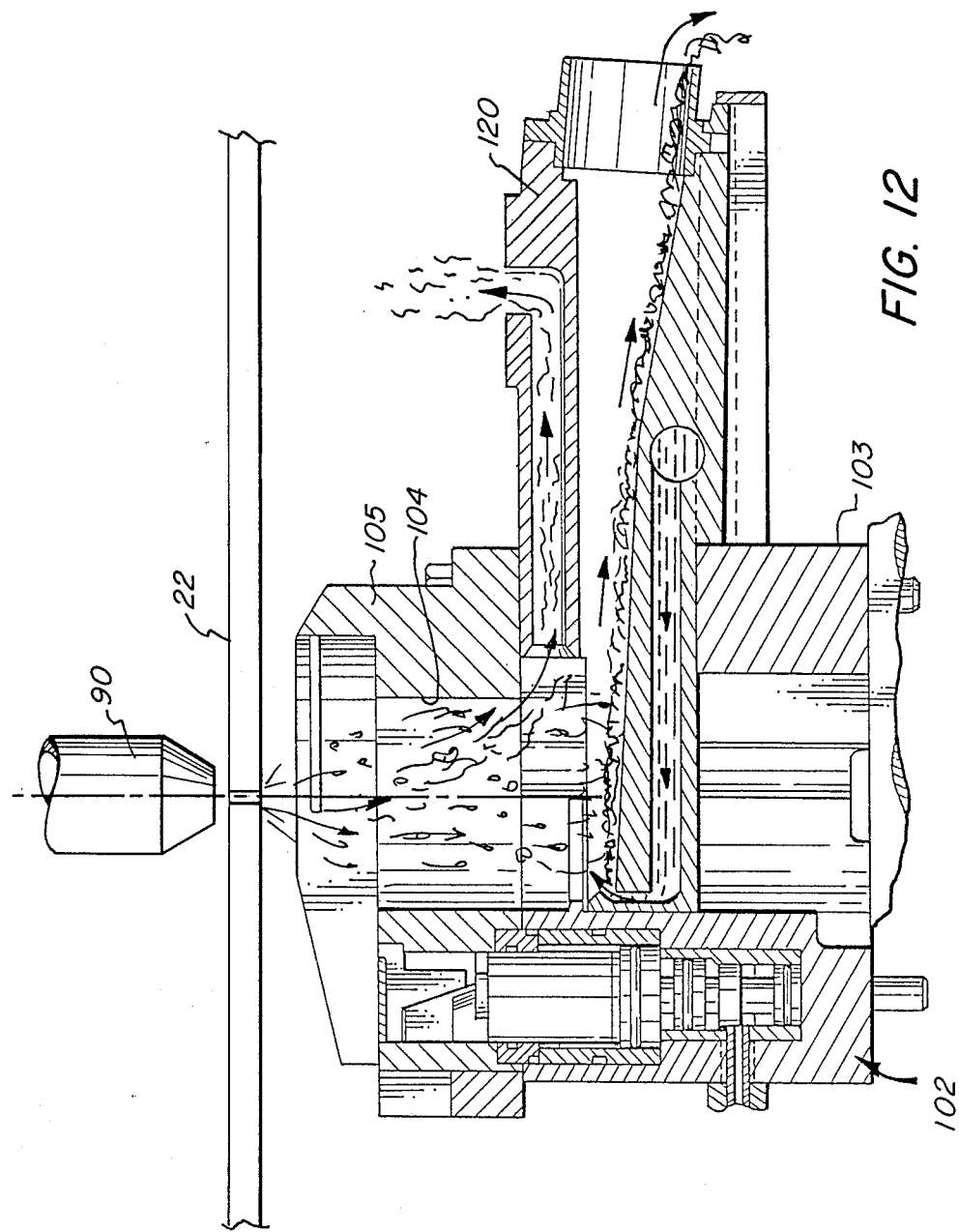
FIG. 12 is a semi-diagrammatic view similar to FIG. 10, showing the flow path of coolant, slag and fume.

Extending from the base member 103 of the support block 102 are a pair of support rods 118 which have their other end supported on the base 12. As seen in FIGS. 6 and 11, the collector member generally designated by the numeral 120 has guide blocks 122 on its sides which are slidable on the rods 118.

The collector 120 is fabricated from several elements including a base element 124 defining an upwardly opening cavity 126 at the inner end thereof which is disposed in the vertical passage 104 under the laser nozzle 90.

As seen in FIGS. 10 and 11, the base element 124 includes a water distribution passage 128 which ends in the upwardly disposed channel 130 so as to cause water to flow upwardly onto the outwardly inclined surface 132 providing the base of the cavity 126.

The top element 134 provides an enclosure above much of the base 124 and provides fume conduits 136 from the upper end of the cavity 126 to an end fitting 138. Similarly an end fitting 140 is provided at the outer end of the collector 120 to receive the water and slag draining from the cavity 126. As seen in FIG. 6, there is also an inlet fitting 142 for the water inlet to a conduit (not shown) which extends to the opening 144 in the base 12.

As seen in FIG. 6, the collector 120 is movable from the position seen in full line in FIG. 6 to a position outwardly of the support block 102 seen in phantom line by the piston 146 of the air motor 148.

In operation, the collector 120 is moved into the support block 102 when laser cutting is to be performed. Water is introduced through the fitting 142 and flows upwardly onto the inner end of the inclined surface 132 to cool the surfaces of the collector 120 under the laser beam and to collect slag particles and carry them to the drain fitting 140. Fume is sucked out through the passages 136 and fitting 138 for transport to a scrubber or filter (not shown).

As will be appreciated, the computer control for the machine effects the operation of the various motors and cylinders to perform the various steps required to bring components into operative position, and to perform the punching or laser cutting operations. The control console is equipped with the typical safety devices for laser operation.

As will be appreciated, the illustrated construction is one which is readily adapted to punch presses having automatic tool changers for exchanging the tools in the punch ram and in a die support located in the base. Because the collector can be moved to an inoperative position independently and out of the way of the die changer, it will not effect the typical movement of the dies from the storage position into the die mounting position.

Thus, it can be seen from the foregoing detailed specification and attached drawings that the machine of the present invention provides a novel collector assembly for fume and slag which may be moved from an operative position in the die support member to an inoperative position spaced therefrom. This enables a large collector to be utilized in addition to a conventional tool changer without interfering with its operation. Moreover, the various operations may be performed automatically and accurately under computer control.

Having thus described the invention, what is claimed is:

1. In a combination punch press and laser cutting machine, the combination comprising:
    (a) a frame having a base and a head extending in spaced relationship thereover;
    (b) a ram assembly in said head having a ram vertically reciprocatable therein relative to said base, the axis of reciprocation of said ram defining a work station;
    (c) a die support member in said base at said work station, said die support member having a first passage extending vertically therethrough and a second passage extending horizontally thereinto in a vertical face thereof;
    (d) a horizontally disposed fume and slag collection member having a portion cooperatively dimensioned and configured to move horizontally inwardly of said horizontal second passage in said die support member and substantially block said vertical first passage, said portion of said collection member having an upwardly opening cavity therein, said collection member also having coolant conduit means therein extending from an inlet to a distributor to distribute coolant about said cavity, waste collecting conduit means extending from the base of said cavity to an outlet; and fume collecting conduit means for collecting fume from the upper part of said portion and extending to an outlet;

(e) means mounting said collection member in said base of said frame for horizontal movement between an operative position wherein said portion extends across said vertical first passage in said die support member and an inoperative position where it is disposed outwardly of said die support member; and (f) drive means for moving said collection member between said operative and inoperative positions.

2. The combination punch press and laser cutting machine in accordance with claim 1 wherein said mounting means includes at least one horizontally disposed support along which said collection member is reciprocatable between said positions.

3. The combination punch press and laser cutting machine in accordance with claim 2 wherein said horizontally disposed support comprises a pair of rods and said support member includes slide elements thereon slidable along said rods.

4. The combination punch press and laser cutting machine in accordance with claim 1 wherein said collecting member has a lower section providing said cavity and a portion of said waste collecting conduit means, and an upper section providing at least a portion of said fume collecting conduit means.

5. The combination punch press and laser cutting machine in accordance with claim 4 wherein said lower section also provides a portion of said coolant conduit means.

6. The combination punch press and laser cutting machine in accordance with claim 5 wherein said coolant conduit means in said lower section has a passage extending below said cavity toward the inner end of said portion and an upwardly extending portion adjacent said inner end to cause coolant to flow over the surface of said member providing said upwardly opening cavity and toward said waste collecting conduit means.

7. The combination punch press and laser cutting machine in accordance with claim 1 wherein the upper surface of said die support member is configured to seat a die member, and wherein there are included punch mounting means on said ram, tool carrier means carrying a multiplicity of punches for mounting in said punch mounting means and cooperating die members for mounting on the upper surface of said die support member, and tool changer means for movement of said punches and die members between said tool carrier means and said punch mounting means and die support member.

8. The combination punch press and laser cutting machine in accordance with claim 7 wherein said tool changer means and tool storage means are disposed at one radial position about said axis of reciprocation of said ram and said horizontal passage and said collection member are disposed at a second position radially displaced therefrom.

9. The combination punch press and laser cutting machine in accordance with claim 8 wherein said radial displacement is approximately 180°.

10. The combination punch press and laser cutting machine in accordance with claim 1 wherein said die support member is of generally rectangular cross section and said horizontal second passage is of generally rectangular cross section with the wall of said support member defining said vertical first passage also providing horizontally extending shoulders about said passage to seat said collection member in said operative position.

11. The combination punch press and laser cutting machine in accordance with claim 1 wherein said die support member has its upper end configured to provide a seating surface for a die member and wherein there is included a die member having a support element cooperatively configured and dimensioned to seat on said seating surface and a die seated in an aperture in said support element.

12. The combination punch press and laser cutting machine in accordance with claim 1 wherein said drive means is controlled by a computer control.

13. The combination punch press and laser cutting machine in accordance with claim 7 wherein said drive means and said tool changer means are controlled by a computer control.

14. The combination punch press and laser cutting machine in accordance with claim 1 wherein there are included means for supplying coolant to said coolant conduit means, fume withdrawal means for drawing fume from said fume collecting conduit means, and discharge means for transporting waste from said collection member to the exterior of said machine.

15. The combination punch press and laser cutting machine in accordance with claim 14 wherein said several means are controlled by a computer control.

16. In a combination punch press and laser cutting machine, the combination comprising:

(a) a frame having a base and a head extending in spaced relationship thereover;

(b) a ram assembly in said head having a ram vertically reciprocatable therein relative to said base, the axis of reciprocation of said ram defining a work station;

(c) a die support member in said base at said work station, said die support member having a first passage extending vertically therethrough and a second passage extending horizontally thereinto in a vertical face thereof;

(d) a horizontally disposed fume and slag collection member having a portion cooperatively dimensioned and configured to move horizontally inwardly of said horizontal second passage in said die support member and substantially block said vertical first passage, said portion of said collection member having an upwardly opening cavity therein, said collection member also having coolant conduit means therein extending from an inlet to a distributor to distribute coolant about said cavity, waste collecting conduit means extending from the base of said cavity to an outlet, and fume collecting conduit means for collecting fume from the upper part of said portion and extending to an outlet, said collection member having a lower section providing said cavity and a portion of said waste collecting conduit means, and an upper section providing at least a portion of said fume collecting conduit means, said lower section also provides a portion of said coolant conduit means, and wherein a coolant conduit means in said lower section has a passage extending below said cavity toward the inner end of said portion and an upwardly extending portion adjacent said inner end to cause coolant to flow over the surface of said member providing said upwardly opening cavity and toward said waste collecting conduit means.

(e) means mounting said collection member in said base of said frame for horizontal movement between an operative position wherein said portion extends across said vertical first passage in said die support member and an inoperative position where it is disposed outwardly of said die support member;, and (f) drive means for moving said collection member between said operative and inoperative positions.

17. The combination punch press and laser cutting machine in accordance with claim 16 wherein said die support member is of generally rectangular cross section and horizontal second passage is of generally rectangular cross section with the wall of said support member defining said vertical first passage also providing horizontally extending shoulders about said passage to seat said collection member in said operative position.

18. The combination punch press and laser cutting machine in accordance with claim 16 wherein said die support member has its upper end configured to provide a seating surface for a die member and wherein there is included a die member having a support element cooperatively configured and dimensioned to seat on said seating surface and a die seated in an aperture in said support element.

19. In a combination punch press and laser cutting machine the combination comprising:

(a) a frame having a base and a head extending in spaced relationship thereover;

(b) a ram assembly in said head having a ram vertically reciprocatable therein relative to said base, the axis of reciprocation of said ram defining a work station, said ram having punch mounting means at its lower end;

(c) a die support member in base at said work station, said die support member a first passage extending vertically therethrough an second passage extending horizontally thereinto in a vertical face thereof, the upper surface of said die support member being configured to seat a die member;

(d) a horizontally disposed fume and slag collection member having a portion cooperatively dimensioned and configured to move horizontally inward of said horizontal second passage in said die support member and substantially block said vertical first passage, said portion of said collection member having an upwardly opening cavity therein, said collection member also having coolant conduit means therein extending from an inlet to a distributor to distribute coolant about said cavity, waste collecting conduit means extending from the base said cavity to an outlet, and fume collecting conduit means for collecting fume from the upper part of said portion and extending to an outlet;

(e) means mounting said collect member in said base of said frame for horizontal movement between an operative position wherein said portion extends across said vertical first passage in said die support member and an inoperative position wherein it is disposed outwardly of said die support member;

(f) drive means for moving said collection member between said operative and inoperative positions;

(g) tool carrier means carrying a multiplicity of punches for mounting in said punch mounting means and cooperating die members for mounting on the upper surface of said die support member; and (h) tool changer means for movement of said punches and die members between said tool carrier means and said punch mounting means and die support member.

20. The combination punch press and laser cutting machine in accordance with claim 19 wherein said tool changer means and tool storage means horizontal are disposed at one radial position about said axis of reciprocation of said ram and said horizontal passage and said collection member are disposed at a second position radially displaced therefrom, said radial displacement being approximately 180°.

21. The combination punch press and laser cutting machine in accordance with claim 19 wherein said drive means and said tool changer means are controlled by a computer control.

22. The combination punch press and cutting machine in accordance with claim 19 wherein there are included means for supplying coolant to said coolant conduit means, fume withdrawal means for drawing fume from said fume collecting conduit means, and discharge means for transporting waste from said collection member to the exterior of said machine.

* * * * *

UNITED STATES PATENT AND TRADEMARK OFFICE
CERTIFICATE OF CORRECTION

PATENT NO. : 4,950,861

DATED : August 21, 1990

INVENTOR(S) : Werner Erlenmaier and Reiner Koch

It is certified that error appears in the above-identified patent and that said Letters Patent is hereby corrected as shown below:

Column 9, Line 36 after "member" insert --having--; line 43 "inward" should be --inwardly--.

Column 10, Lines 5 and 6, after "base" insert --of--; line 9 "collect" should be --collection--.

Signed and Sealed this

Seventeenth Day of March, 1992

Attest:

HARRY F. MANBECK, JR.

Attesting Officer      Commissioner of Patents and Trademarks